(12) United States Patent
Soder (10) Patent No.: US 7,354,217 B2
(45) Date of Patent: Apr. 8, 2008

(54) FASTENING DEVICE AND METHOD FOR ATTACHING AN OBJECT TO A SUPPORT STRUCTURE

(75) Inventor: Kenneth Soder, Sodertalje (SE)

(73) Assignee: Scania CV AB (publ) (SE)

( * ) Notice: Subject to any disclaimer, the term of this patent is extended or adjusted under 35 U.S.C. 154(b) by 262 days.

(21) Appl. No.: 10/496,204

(22) PCT Filed: Dec. 23, 2002

(86) PCT No.: PCT/SE02/02445

§ 371 (c)(1),
(2), (4) Date: May 19, 2004

(87) PCT Pub. No.: WO03/056191

PCT Pub. Date: Jul. 10, 2003

(65) Prior Publication Data

US 2004/0258468 A1    Dec. 23, 2004

(30) Foreign Application Priority Data

Dec. 27, 2001    (SE)    ................................. 0104393

(51) Int. Cl.
*F16B 21/02*    (2006.01)
*F16B 2/18*    (2006.01)

(52) U.S. Cl. ................ 403/374.5; 403/252; 403/374.1; 403/409.1; 403/DIG. 8; 411/354; 411/355

(58) Field of Classification Search ................ 403/168, 403/338, 365, 374.5, 388, 396, DIG. 8, 252, 403/409.1; 292/44, 49, 215; 411/354, 355
See application file for complete search history.

(56) References Cited

U.S. PATENT DOCUMENTS

| | | | | |
|---|---|---|---|---|
| 228,697 A | * | 6/1880 | Thompson | .................. 411/355 |
| 1,084,379 A | * | 1/1914 | Wile | ........................ 403/374.5 |
| 1,461,195 A | * | 7/1923 | Meyer | .......................... 411/355 |
| 1,776,007 A | * | 9/1930 | Peters | .......................... 411/355 |
| 4,111,470 A | * | 9/1978 | Welcker | ...................... 285/320 |
| 4,212,559 A | | 7/1980 | Persson | |
| 4,391,031 A | * | 7/1983 | Laugier | ...................... 403/252 |
| 4,435,105 A | * | 3/1984 | Rampley | ..................... 403/350 |

(Continued)

FOREIGN PATENT DOCUMENTS

| | | |
|---|---|---|
| CH | 671193 A5 * | 8/1989 |
| DE | 1 805 210 | 10/1969 |
| DE | 2 608 884 | 9/1977 |
| EP | 0 151 263 | 8/1985 |
| GB | 1 585 182 | 2/1981 |

*Primary Examiner*—Daniel P. Stodola
*Assistant Examiner*—Ernesto Garcia
(74) *Attorney, Agent, or Firm*—Ostrolenk, Faber, Gerb & Soffen, LLP (57) ABSTRACT

A fastening device for attaching an object to a support structure, comprising at least one locking member on the object or the support structure and adapted for insertion in an aperture running through the support structure or the object. A transverse hole in the locking member which, at the time of fitting the object, is adapted to be partly masked by the material surrounding the aperture. An engagement device having a cross-section with a varying distance between its center point and its periphery is inserted in the unmasked portion of the transverse hole running through the locking member and is turned thereafter from one position to another position to bring about a clamping action between the object and the support structure. Also a method for attaching an object to a support structure using the above device.

3 Claims, 5 Drawing Sheets

U.S. PATENT DOCUMENTS 5,135,330 A * 8/1992 Chen ...................... 403/374.5
5,590,973 A * 1/1997 Don-Yehiya ........... 403/DIG. 8
5,792,046 A * 8/1998 Dobrovolny ............. 403/374.1
6,910,590 B2 * 6/2005 Meier ........................ 211/175

* cited by examiner

FASTENING DEVICE AND METHOD FOR ATTACHING AN OBJECT TO A SUPPORT STRUCTURE

BACKGROUND OF THE INVENTION

1. Technical Field

The present invention relates to a fastening device for attaching an object to a support structure, comprising at least one locking member arranged on the object or on the support structure, which locking member is for insertion in an aperture running through the support structure and/or the object, and a method for attaching an object to a support structure.

2. State of the Art

The fitting of components in, for example, the vehicle industry commonly involves the use of threaded connections, e.g. for fitting seats and the like in vehicles. Such threaded connections are often situated so as not to be readily accessible, thereby entailing unnecessarily heavy and expensive fastening devices. With conventional threaded connections at locations where access is difficult, it is in practice impossible to achieve good ergonomics for fitters, who often have to work in positions which are very unfavourable from the stress point of view.

Examples of various devices of the kind indicated in principle in the introduction are referred to in EP 0 151 263, DE 1 805 210, DE 26 08 884 and U.S. Pat. No. 4,212,559, but none of the devices according to those documents solve the problem of accessibility in cases where access to the fastening location is difficult.

SUMMARY OF THE INVENTION

The present invention is intended to solve the problem associated with the state of the art. More specifically, the invention relates to a fastening device for attaching an object to a support structure. The device comprises a locking member arranged on the object or on the support structure, which locking member is for insertion in an aperture running through the support structure or through the object. The locking member has running through it a transverse hole which is adapted, when the object is being fitted, to be partly masked by the material surrounding the aforesaid aperture, while a means of engagement having a cross-section which exhibits a varying distance between its center point and its periphery is arranged to be inserted in the unmasked portion of the transverse hole in the locking member and thereafter to be turned from an inactive position to an active position whereby it brings about a clamping action between the object and the support structure.

The invention further relates to a method for attaching an object to a support structure, comprising the following steps:

arranging on the object or on the support structure a locking member which has running through it a transverse hole;

inserting the locking member in an aperture which runs through the support structure or through the object, whereby the material surrounding said aperture partly masks said hole;

introducing a means of engagement having a cross-section which exhibits a varying distance between its center point and its periphery into the unmasked portion of the transverse hole running through the locking member;

turning the means of engagement from an inactive position to an active position whereby it brings about a clamping action between the object and the support structure.

The cross-sectional dimensions of the means of engagement are adapted so that the largest dimension of said means exceeds the largest distance between the inside of the hole and the surface of the material which partly masks the hole.

The means of engagement may exhibit a chamfered circular cross-section to enable said means to be introduced into the partly masked hole and to bring about thereafter the desired clamping action between the object and the support structure.

According to an alternative version, the means of engagement may exhibit an elliptical cross-section.

The means of engagement may preferably be provided with a shank which is angled, e.g. L-shaped, whereby the fastening device can, by means of the angled shank, be maneuvered at a distance from the actual fastening point. When the means of engagement is in its active position, the angled shank may with advantage be locked in position to prevent inadvertent release of the connection between the object and the support structure. In one embodiment, the active position of the means of engagement is not stable but is subject to a turning moment urging the means of engagement to revert to its inactive position. In this case the means of engagement may act as a torsion spring which can by preloading be locked in the active position by a locking device or the like which is preferably arranged on the support structure or on the object. The shell surface of the means of engagement which is intended to engage with the support structure or with the object may also be provided with friction-enhancing means for holding the means of engagement in its active position by friction grip and thereby counteracting any turning moment which tends to urge the means of engagement to revert to its inactive position.

In an alternative embodiment, the cross-section of the means of engagement is so designed that a stable active position of the means of engagement can be reached, e.g. by designing the means of engagement with a circular cross-section which exhibits first and second chamfers, the second of which is smaller than the first. The first chamfer allows the means of engagement to be introduced into the unmasked portion of the hole running through the locking member in its inactive position. Turning the means of engagement results in a clamping action and in the assumption of a stable active position when the smaller second chamfer is in the same position as that which the first chamfer was in when the means of engagement was introduced. In this situation the means of engagement is thus self-locking in its active position and there is no need for any external locking device. In such cases the means of engagement can be provided with a straight shank which exhibits at its outer end engagement surfaces such as recesses or an internal hexagon for cooperation with a tightening tool.

According to a particular embodiment of the invention, the locking member is welded firmly to the object or to the support structure.

According to an alternative embodiment, the device comprises a separate fastening means whereby the locking member takes the form of a head of the fastening means, and the fastening means is intended to be anchored to the object before the latter is fitted to the end of said fastening means which points away from the head. The fastening means may preferably be provided with a threaded portion at its end which points away from the head, in which case the fastening means is intended to be screwed firmly into the object or into the support structure. Alternatively, the fastening means may be provided with an insert portion intended to be accommodated in an opening in the object or in the support structure and to be anchored therein by means of a snap-in function.

In a further conceivable embodiment, the locking member may take the form of an integrated protruding portion of the object or of the support structure, e.g. a protruding flange created by bending the material of the object.

To make it easier to insert the locking member in the corresponding aperture, the locking member may preferably be conical or otherwise chamfered at its free end in order thereby to provide guidance as it enters the aperture.

In one embodiment of the invention, the support structure or the object exhibits recesses, e.g. in the form of stiffening corrugations, which form a hollow in the surface against which the means of engagement is arranged to exert the clamping action. The recess thus provides guidance for the means of engagement as the latter is introduced into the unmasked portion of the transverse hole running through the locking member.

To ensure that the transverse hole running through the locking member is fitted in the desired position for inserting the means of engagement, the locking member may preferably have a cross-sectional shape such that it comes to rest in a controlled position in the corresponding aperture in the support structure. The member and the corresponding aperture in the support structure may for example have a rectangular cross-section.

According to a particular embodiment, a number of locking members which each have a transverse hole running through them are arranged in a substantially straight line on the object or on the support structure. The locking members are inserted in apertures which run through the support structure or through the object, and the material surrounding said apertures partly masks the respective hole in each locking member. Introducing an elongate means of engagement having a cross-section which exhibits a varying distance between its center point and its periphery in the unmasked portion of the transverse hole running through each locking member arranged along the substantially straight line, followed by turning the means of engagement from an inactive position to an active position, brings about a connection between the object and the support structure at a multiplicity of points by means of a single manual action. The length of the means of engagement is adapted according to the number of locking members. The length of the latter is dimensioned so that the means of engagement reaches through the holes in all the locking members.

According to a still further embodiment, the fastening means is made from a sheet material. Preferably, the locking member is formed by a loop of the sheet material.

BRIEF DESCRIPTION OF THE DRAWINGS

Applications according to the present invention are described below with reference to the attached drawings, without thereby limiting the scope of protection.

DESCRIPTION OF PREFERRED EMBODIMENTS

Referring to FIGS. 1A-1E, the present invention relates to a fastening device for attaching an object 30, e.g. a vehicle seat or a refrigerator for a vehicle cab, to a support structure 40, such as, for example, a bottom plate of a vehicle. The device comprises a locking pin or locking member 14 in the form of a head of a fastening means 10. The fastening means 10 is intended to be anchored to the object 30 by a threaded portion 12 in a corresponding threaded aperture 32 in the object 30.

According to one alternative embodiment, the locking pin 14 is instead welded firmly to the object, thereby obviating the assembly step of screwing the fastening means 10 in as described above.

According to a further alternative embodiment, the locking pin 14 is fixed in the object by being introduced into an unthreaded hole corresponding to the threaded aperture 32 and by being secured by press fit.

Figure 1A:
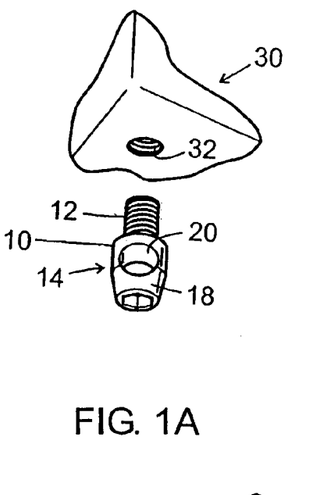
FIGS. 1A-E depict a fastening device according to the invention, whereby a separate fastening device is fitted in an object, is inserted in an aperture running through a support structure and is locked firmly by a means of engagement.
Figure 1B:
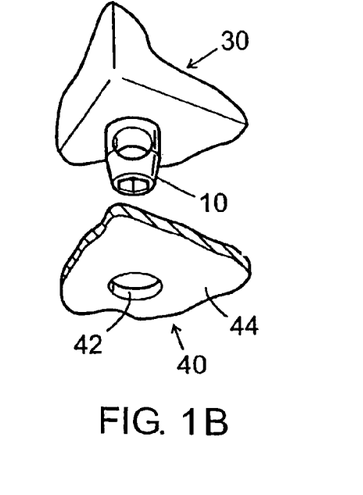
Figure 1C:
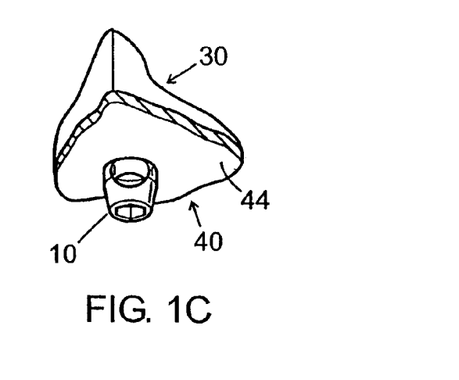
Figure 1D:
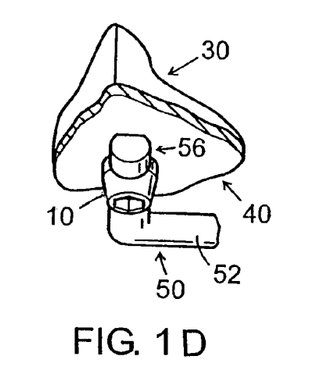
Figure 1E:
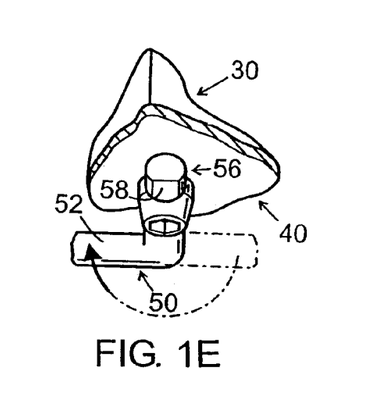
Figure 2A:
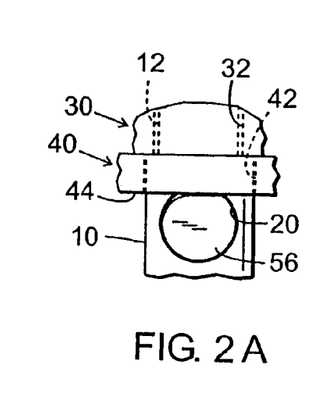
FIGS. 2A-C depict firm locking by friction of the means of engagement.
Figure 2B:
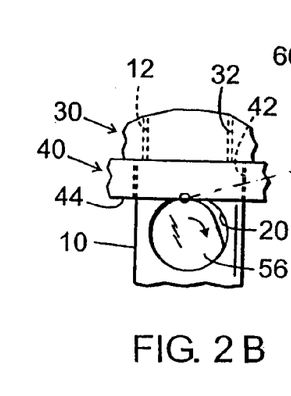

The locking pin 14 has running through it a transverse hole 20. Fitting the object 30 to the support structure 40 involves inserting the locking pin 14 into an aperture 42 which runs through the support structure. The movement of the locking pin 14 into the aperture 42 is limited preferably by the surface of the object 30 coming into contact with the surface of the support structure which faces towards the object. To provide the locking pin 14 with guidance as it enters the aperture 42 and thereby to facilitate assembly, the locking pin 14 exhibits a chamfer 18 at its free end. When the locking pin 14 has been inserted through the aperture 42, the transverse hole 20 will be partly masked by the thickness of the material of the support structure 40, and the unmasked portion of the hole 20 will form an opening with the shape of the truncated circle. The device further comprises a locking element 50 incorporating a means of engagement 56 intended to be introduced into the unmasked portion of the hole 20, and the means of engagement 56 of the locking element 50 exhibits a cross-section which is adapted to being able to be introduced freely into the unmasked portion of the hole 20. This cross-section exhibits a varying distance between its center point and its periphery and may, as depicted in FIGS. 1D and 1E, be circular with a chamfer 58. The dimensions of the cross-section are adapted so the latter's shell surface abuts against the inside of the hole 20 along the whole periphery of the cross-section except the chamfer, which provides space for the thickness of the material of the support structure 40. Rotating the means of engagement 56 will thus result in the shell surface bringing about a clamping action against the surface 44 of the support structure. At the time of insertion of the means of engagement 56 in the hole 20, the chamfer is intended to be facing towards the support structure 40. When the chamfer is in this position, the means of engagement is thus in its inactive position and brings about no clamping action between the object 30 and the support structure 40 (see FIG. 2A). Turning the means of engagement 56 as depicted in FIG. 2B will cause said means of engagement to move to an active position in which the periphery of the cross-section brings about a clamping action between the object 30 and the support structure 40 and thereby creates a firm connection between them.

Figure 6:
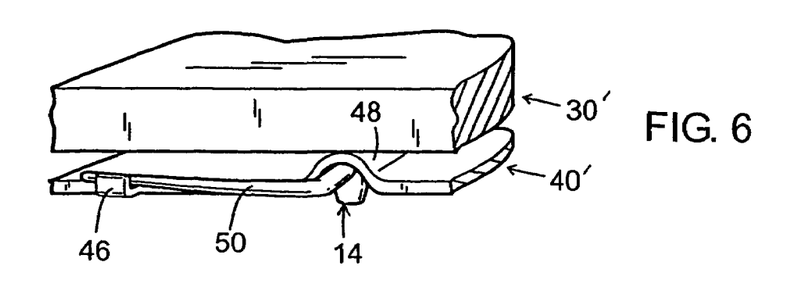
FIG. 6 depicts the means of engagement locked firmly in the active position by a locking device.

As depicted in FIGS. 1D and 1E and FIG. 6, the locking element 50 is preferably provided with an angled shank 52 which makes the means of engagement easier to maneuver. FIG. 6 shows how the means of engagement is held securely in its active position by the angled shank being fixed by a locking device 46 arranged integrally with the support structure in the form of a protruding flap of the material.

Figure 2C:
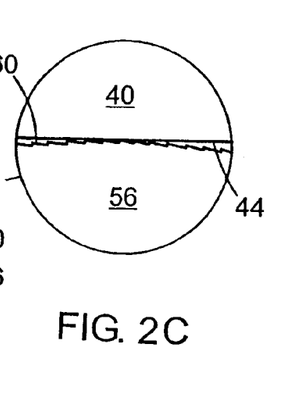

The shell surface of the means of engagement 56 is preferably provided with friction-enhancing means 60, as depicted in detail in FIG. 2C, to counter inadvertent dislodging of the means of engagement from its active position.

Figure 3:
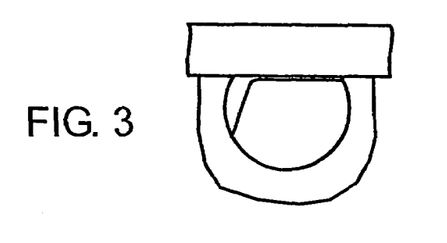
FIGS. 3 and 3A depict the means of engagement in stable inactive and active positions respectively in a case where the cross-section of the means of engagement is circular with two chamfers of different sizes situated adjacent to one another.
Figure 3A:
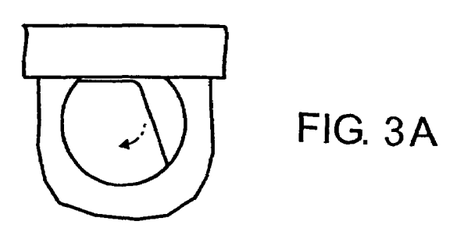
Figure 4:
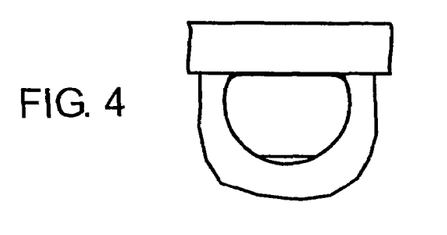
FIGS. 4 and 4A depict the means of engagement in stable inactive and active positions respectively in a case where the cross-section of the means of engagement is circular with two chamfers of different sizes situated diametrically opposite one another.
Figure 4A:
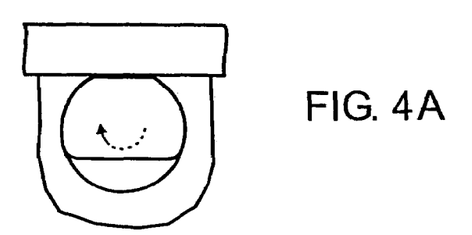
Figure 5:
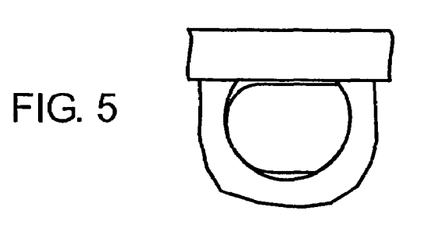
FIGS. 5 and 5A depict the means of engagement in stable inactive and active positions respectively in a case where the cross-section has been rounded to facilitate change of position between active and inactive positions.
Figure 5A:
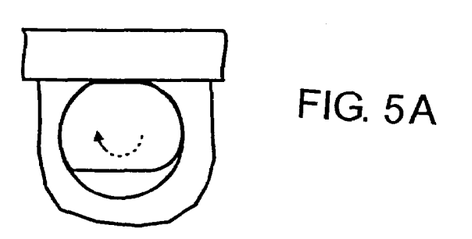

FIGS. 3, 3A, 4, 4A, 5, and 5A depict alternative embodiments of the cross-section of the means of engagement 56. These cross-sections exhibit two chamfers, one of which is smaller than the other. The larger is the chamfer, the shorter is its radial distance from a center axis. A stable active position for the means of engagement can thus be provided in the manner described below. The means of engagement 56 is inserted in the hole 20 with the larger chamfer facing towards the support structure 40 in the same manner as described above. Thereafter the means of engagement is turned until the smaller chamfer assumes the previous position of the larger chamfer, thereby causing a clamping action in a stable position. The dimensions of the cross-sections depicted in FIGS. 3-5 are adapted so that their shell surfaces abut against the inside of the hole 20 at at least two diametrically opposite points in the hole.

FIG. 5 depicts a cross-section with a rounded transition between the chamfers and the circular shell surface with the object of facilitating the change of position of the means of engagement between active and inactive positions.

FIG. 6 depicts a preferred embodiment of the invention whereby the support structure 40' exhibits a stiffening corrugation 48 which forms a hollow on the side of the support structure which faces away from the object 30'. The corrugation thus provides guidance for the locking element 50 at the time of inserting the means of engagement 56 into the unmasked portion of the transverse hole 20 running through the locking pin.

According to an alternative embodiment, shown in FIGS. 13A-13D, what is shown as an object in FIGS. 1A-1E is being shown as a support structure in FIGS. 13A-13D and what is shown as a support structure in FIGS. 1B-1E is being shown as an object in FIGS. 13A-13D so that the reference notation 30 in FIGS. 1A-1E which denotes the object to be fitted is changed to 40"" in FIGS. 13A-13D and denotes instead the support structure and the reference notation 40 which denotes the support structure in FIGS. 1B-1E is changed to 30"" in FIGS. 13A-13D and denotes instead the object to be fitted. The object 30"" has a surface 44' corresponding to surface 44 of the support structure 40, the surface 44 being so labeled in FIGS. 1B and 1C. In this case the locking pin 14 is arranged on the support structure 40"", is inserted in an aperture 42" running through the object 30"", and is anchored in the support structure 40"" by the threaded portion 12 of the locking pin 14 fitting in a corresponding threaded aperture 32" in the support structure 40"". Otherwise the function of the invention is the same as described above. In a manner corresponding to that described above, the object 30"" may exhibit a stiffening corrugation which forms a hollow on the side of the object 30"" which faces away from the support structure 40"" corresponding to the stiffening corrugation 48 which forms a hollow on the side of the support structure 40' which faces away from the object 30' in FIG. 6.

According to a particularly preferred embodiment, a number of locking pins 14 are arranged in a substantially straight line in such a way that the partly masked holes 20 are accessible simultaneously to a single means of engagement 56. A connection between the object and the support structure can thus be created at a multiplicity of points by a single turning of the means of engagement.

To achieve the desired locking action, a series of different non-circular cross-sections of the means of engagement are of course also possible. The invention is thus not to be regarded as limited by the embodiments described above, which are to be regarded as merely examples. One skilled in the art will find many embodiments within the scope of the claims.

Figure 7:
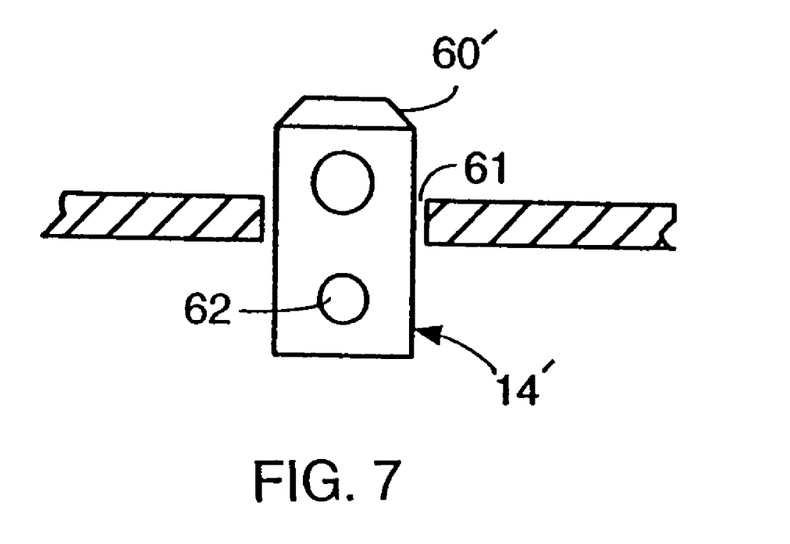
FIG. 7 shows a locking member according to an embodiment of the invention.
Figure 8:
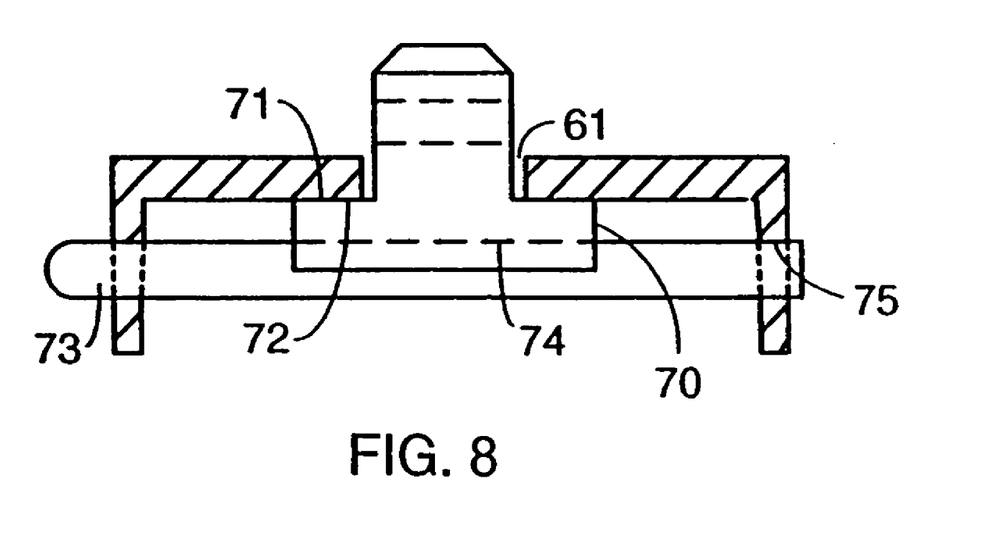
FIG. 8 shows a locking member according to another embodiment of the invention.
Figure 9:
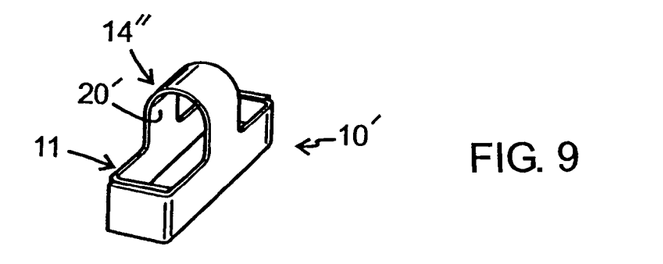
FIG. 9 shows a fastening means according to the invention made from a sheet material.
Figure 10:
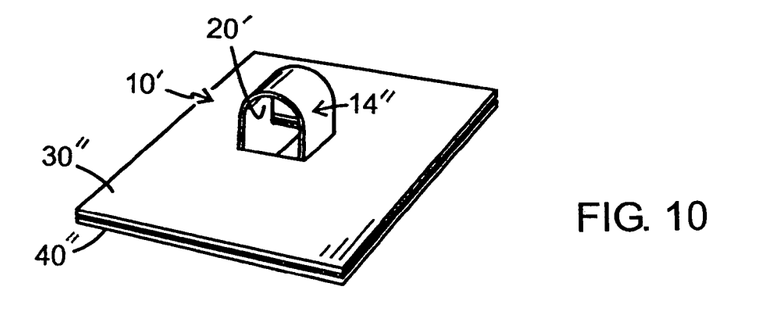
FIG. 10 shows a fastening means according to FIG. 9 having its locking means inserted through apertures of a pair of objects to be clamped together.

It is of course also the case that although the locking pin 14 is depicted in FIGS. 1A-1E and 2A-2B with a substantially circular or conical shell surface, the geometrical structure of the locking pin may be varied within the scope of the invention. Another embodiment of the locking pin 14 is shown in FIG. 7, where the locking pin 14' is a straight block having a square cross section and chamfered edges 60' to facilitate guidance of the locking pin as it enters an aperture/through-hole 61. Although the locking pins in the first described embodiments are securely fixed to the object 30 or to the support structure 40 by threads, press fits or weld seams, it is within the scope of the invention to arrange the locking pins in such a way as to allow a limited movement relative to the object 30 or to the support structure 40, i.e. providing a "floating" connection between the locking pin 14' and the object/support structure. A way to provide this is by letting the aperture/through-hole 61 have a cross-section which is somewhat larger than the corresponding cross-section of the locking pin 14' and by designing the locking pin 14' with a second transverse hole 62 running through it. The larger aperture 61 also facilitates assembly. The second transverse hole 62 is adapted to accommodate a second locking element (not shown in FIG. 7, but in FIG. 8), e.g. a circular cylindrical locking dowel for retaining the locking pin 14' in the hole. In this case the object 30/support structure 40 must of course incorporate some means, such as holes, recesses or some fastening means, for allowing the second locking element to be introduced through the second transverse hole and thereby to connect the locking pin to the object/the support structure, see e.g. Yet another embodiment for securing the locking pins to the object 30 or to the support structure 40 through a locking device is shown in FIG. 8, where the locking pin comprises a flange or at least one shoulder portion 70 extending out from the other parts of the locking pin in a direction transverse to the longitudinal center line of the locking pin for providing a stop surface 71 adapted to be in contact with a contact surface 72 of the object/support structure. The contact between the stop surface 71 and the contact surface 72 prevents the locking pin from falling out of the aperture 61 in one direction. In order to prevent the locking pin from disengaging the object or the support structure, e.g. falling out of the aperture 61 in an opposite direction to the one prevented by the stop surface 71, the locking device 73 is adapted to bear on a second contact surface 74 of the locking pin substantially opposite the stop surface 71. In FIG. 8 the second contact surface 74 is shaped as a semi-circular recess adapted to fit the circular cylindrical envelope surface of the locking device 73 and thereby providing an improved holding of the locking pin against the object/support structure. The locking device 73 may be resilient in order to provide a floating connection between the locking pin and the object/support structure. The means for holding the locking device 73 in position is here openings 75 in the object/support structure through which openings the locking device 73 is inserted in order to enable the floating connection/fastening of the locking pin against the object/support structure. Such a floating connection creates the possibility of significantly larger manufacturing and assembly tolerances than with entirely fixed locking pins.

Figure 11:
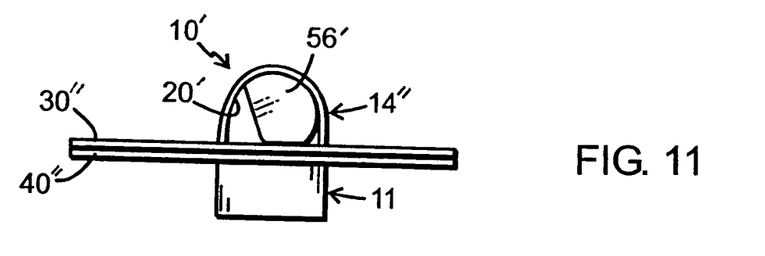
FIG. 11 shows the fastening means according to FIG. 9 having a means of engagement inserted into and locked in the locking member.

In the embodiment shown in FIGS. 9 to 12 the fastening means 10' is made from sheet material such as sheet metal which is shaped and bent to the shown three-dimensional configuration comprising a locking member 14" and an enlarged engagement portion 11. The ends of the material strips forming the enlarged portion 11 are preferably welded together (not shown). As is apparent from FIG. 10, in this embodiment the bent sheet material of locking member 14" is shaped as a loop defining the transverse hole 20' adapted to receive the means of engagement 56' (FIG. 11). The enlarged engagement portion 11 functions as a bolt head when the locking member 14" is inserted through the objects, 30", 40" in FIGS. 10-11 and 30''', 40''' in FIG. 12, to be clamped together. The three-dimensionally shaped sheet material gives sufficient structural strength to the fastening means 10' and lowers the manufacturing cost as compared to the massive embodiments described in the foregoing which need expensive machining operations.

Figure 12:
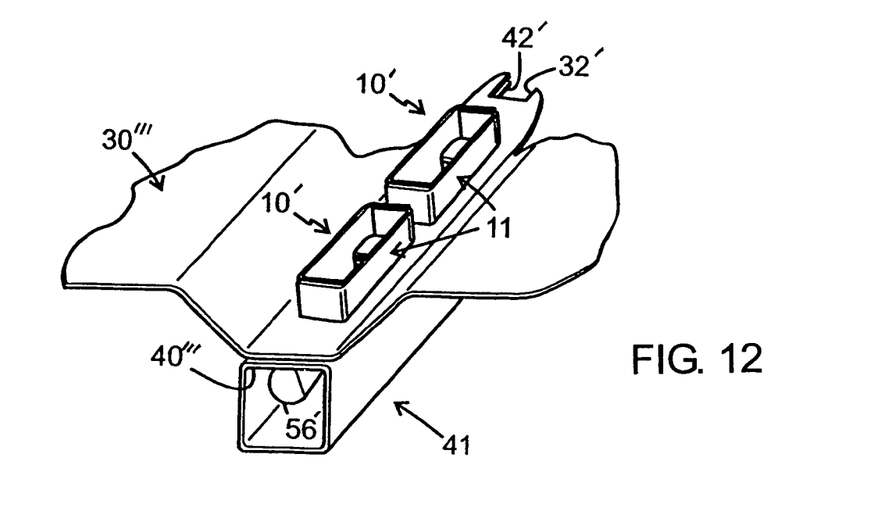
FIG. 12 is a view with parts broken away showing a plurality of fastening devices using a common means of engagement.
Figure 13A:
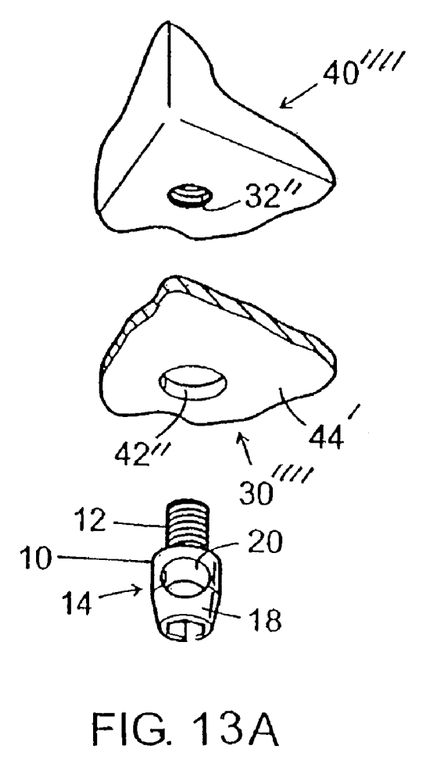
FIGS. 13A-D depict a fastening device according to the invention, whereby a separate fastening device is fitted in a support structure, is inserted in an aperture running through an object and is locked firmly by a means of engagement.
Figure 13B:
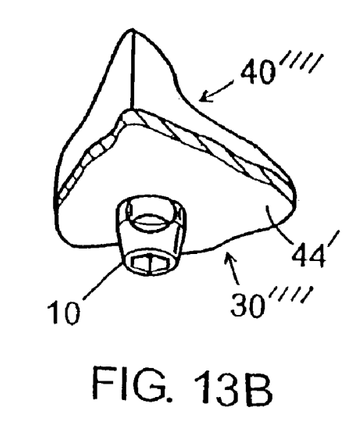
Figure 13C:
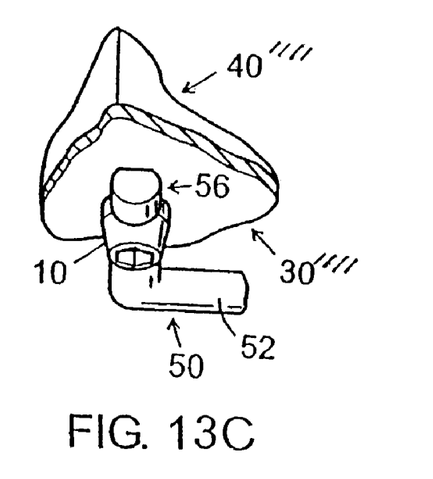
Figure 13D:
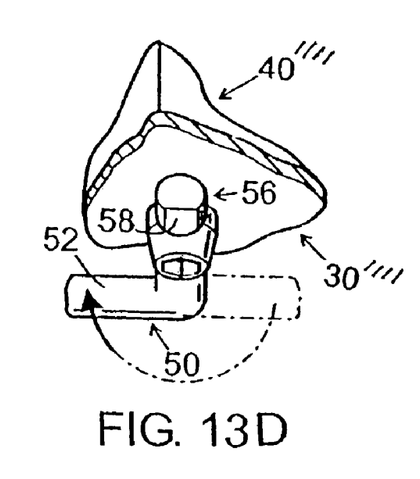

FIG. 12 shows the principle of using a common means of engagement 56' for a plurality of fastening means 10'. In this case the support structure 40 is a wall member of a box beam 41. Accordingly, the means of engagement 56' will extend, enclosed in the interior of the box beam, for engagement into each transverse hole of the plurality of fastening means 10'.

FIGS. 13A-D shows the reverse of the arrangement illustrated in FIGS. 1A-E, wherein the fastening device is fitted into a support structure, then inserted in an aperture running through an object, and is locked firmly by a means of engagement.

The invention claimed is:

1. A combination of a fastening device, an object, and a support structure, the fastening device attaching the object to the support structure, the fastening device comprising at least one locking member arranged on the object or on the support structure, an aperture which runs at least partly through the other of the support structure or the object, the locking member being adapted for insertion in the aperture;

the locking member having a transverse hole running through the locking member, the locking member being so shaped with respect to the object and the support structure and the aperture being so shaped and so located on the support structure or the object that the transverse hole after insertion of the locking member in the aperture is partly masked by material surrounding the aperture;

an engagement element having a cross-section with a respective varying distance between its center point and its periphery at first and second locations around its periphery, said engagement element having a chamfered circular cross-section with respective chamfers defining the first and second locations, the engagement element is arranged to be inserted in an unmasked portion of the transverse hole in the locking member and to be turned thereafter in the hole from an inactive position at insertion of the engagement element with the first location positioned toward a surface of the one of the object and the support structure having the aperture therethrough and to an active position with the second location positioned to engage the surface of the one of the object and the support structure having the aperture therethrough, the second location having such distance from the center point of the engagement element that the engagement element brings about a clamping action between the object and the support structure when the second location engages the surface, wherein the fastening device incorporates a fastening element, the locking member comprises a head of the fastening element, the locking member further comprises a threaded portion, and the fastening element is adapted to be threadably anchored portion to the object or to the support structure at a first end of the fastening element which points away from the head before the fitting of the support structure or of the object to the fastening element.

2. A fastening device according to claim 1, wherein the engagement element includes an angled shank.

3. A fastening device according to claim 1, wherein the fastening element has the threaded portion at its first end which points away from the head, and the fastening element is adapted to be screwed firmly into the object or into the support structure before the fitting of the support structure or the object.

\* \* \* \* \*